Aug. 27, 1929. J. A. TIDBALL 1,726,507
CROWN AND TRAVELING BLOCK PULLEY
Filed Aug. 17, 1927
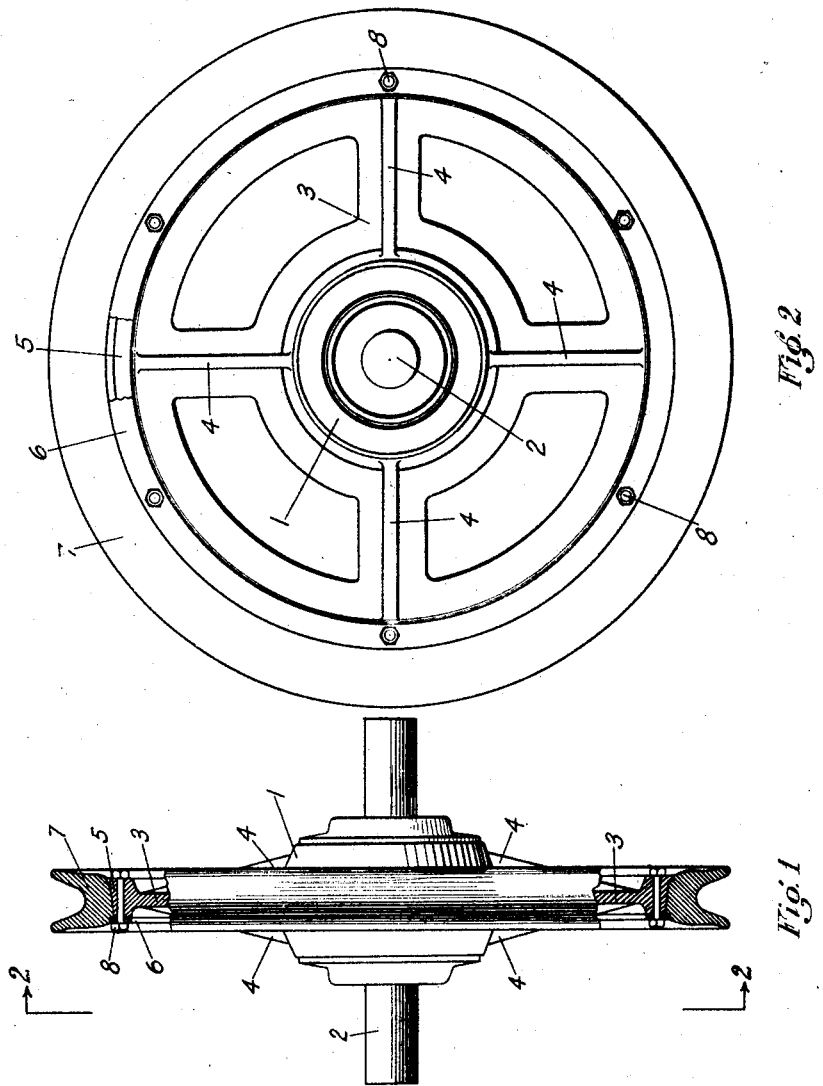
INVENTOR.
John A. Tidball
BY
ATTORNEY.

Patented Aug. 27, 1929.

1,726,507

UNITED STATES PATENT OFFICE.

JOHN A. TIDBALL, OF DALLAS, TEXAS, ASSIGNOR TO THE INTERNATIONAL DERRICK AND EQUIPMENT COMPANY, OF COLUMBUS, OHIO, A CORPORATION OF OHIO.

CROWN AND TRAVELING BLOCK PULLEY.

Application filed August 17, 1927. Serial No. 213,517.

My invention relates to crown and traveling block pulleys and, more particularly, to crown block and traveling block pulleys or sheave wheels used in drilling rig structures such as are employed in oil fields.

Many of the pulley or sheave wheels now being used in the oil industry are made of cast iron and are provided with wooden or babbitted bearings. It is well known that these pulleys or sheaves are subjected to very great loads and the pulleys and sheaves as well as the bearings are subjected to abrasive action of sand and grit carried by the cables, therefore, the life of the pulleys or sheaves and of the bearings is very short.

In order to prolong the life of the pulleys or sheaves and the bearings it has recently become customary to mount the pulleys or sheaves on anti-friction roller bearings which are protected from the abrasive and wearing action of sand and grit by a covering, and to partially construct the pulleys or sheaves of harder and better wearing material such, for instance, as manganese steel. By partially constructing the pulley or sheave of material such as manganese steel the life of the pulley or sheave has been considerably increased, but has not been increased to the same extent as the bearings. It is, therefore, desirable to have a pulley or sheave the rim of which may be replaced when the groove has become worn.

It has been proposed to make the rims of the pulley or sheave in a single piece and fasten this rim to the pulley or sheave by means of rivets. In this instance the inside of the rim has been made with a relatively short annular web engaging about and having a tight fit over the web of the hub portion of the pulley or sheave. This rim has been fixedly secured to the short annular web by means of rivets extending through registering notches formed in opposing portions of the web of the rim and the web of the hub respectively.

Such construction is more or less impractical for oil field service because of the fact that it is desirable to have the pulley or sheave so constructed that a new rim may be applied when necessary without lowering the pulley or sheave to the ground in order to make this application.

The primary object of my invention is to provide a pulley or sheave wheel capable of carrying a heavy running load and to withstand abrasive and other destructive action.

Another object of my invention is to provide a pulley or sheave wheel having a minimum of parts and being so constructed that the rim may be renewed without lowering the entire pulley or sheave to the ground.

Still another object of my invention is to provide a pulley or sheave wheel made up of a minimum number of parts whereby there will be little or no chance of the parts shifting or presenting sharp ends which would be injurious to the wire line.

Other objects of my invention will be seen in the following detailed description and the preferred embodiment of my invention may be seen in the accompanying drawing wherein similar characters of reference designate corresponding parts and wherein:

Figure 1 is an edge view, partly in section and with parts broken away, to show the preferred construction of my device.

Figure 2 is a side view taken on the line 2—2 of Figure 1.

With reference to the drawings, the numeral 1 represents the center or hub portion of a sheave or crown block and traveling block pulley. This central or hub portion is mounted upon a shaft 2 by means of bearings (not shown) which are preferably of the anti-friction ball or roller type. Such central or hub portion 1 forms the principal weight carrying portion of the sheave or pulley and such portion may be made of cast iron or some other relatively inexpensive material preferably such that it may be easily machined. An annular flange or web 3 is preferably formed integrally with the central portion of the hub 1 and flange or rib portions 4 radiate from the central portion of hub 1 across the surface of the web 3 to provide a means for strengthening the web portion.

As shown in Figure 1, the outer periphery of the web portion 3 is enlarged and is tapered and stepped as at 5. Such enlarged portion provides a means whereby a rim 7 may be disposed on the sheave or pulley. The rim 7 is preferably made of some hard, wear resisting material such as manganese steel and is grooved in the manner shown in Figure 1 for the reception of a wire line or other cable. The rim 7 may be grooved in any manner suiting the preference of the user.

The rim 7 is tapered and stepped on its inner periphery to conform to the tapered and stepped outer periphery of the enlarged portion of the web 3. As a means for securing the rim 7 to the enlarged portion of the web 3 I have provided a ring 6 which is of such size that it will abut against a part of the rim 7 and against a part of the enlarged portion of the web 3 respectively. This ring 6 is held securely against these respective parts by the bolts 8 which extend through the ring 6 and the enlarged portion of the web 3.

By referring to the preceding description and the drawings attached hereto it will be seen that I have provided a device that may be assembled or disassembled for renewal of the rim, without lowering the entire sheave or pulley to the ground. This has been accomplished by the novel method of construction of the sheave or pulley and the novel method of securing the rim 7 to the web 3. While such novel fastening means is very easily loosened prior to the removal of the rim 7 the rim when secured to the web 3 by this fastening means, will be interlocked with the web to form a unitary rigid structure.

The rim 7 is made in one endless piece, which is an important feature of my invention. With such construction there will be no chance of the parts shifting and presenting sharp ends which would be injurious to the wire line or other cable traveling in the groove in the rim. At the same time, the structure will retain the advantage of a sheave or pulley the rim of which may be removed and renewed without lowering the entire sheave or pulley to the ground.

Furthermore, as shown in Figure 1 of the drawings, the outer periphery of the web or flange portion 3 is tapered. By having the outer periphery tapered a tight fit between the web or flange portion and the rim is assured.

Many minor changes may be made in the various parts of my invention without departing from its scope.

Having thus described my invention what I claim is:

1. A pulley for crown blocks, traveling blocks and the like comprising a sheave hub, an outstanding circular web on said hub having an inclined and stepped outer peripheral surface, a rim portion having an inclined and stepped inner peripheral surface adapted to be mounted on said web, a ring adapted to abut against a part of said web and rim respectively to hold said rim on said web, the inclined and stepped peripheral surface of the rim cooperating with the inclined and stepped peripheral surface of the web to wedgingly hold said rim portion on said web portion, and means for maintaining said ring in abutting relation with said rim and said web.

2. A pulley for crown blocks, traveling blocks and the like comprising a sheave hub, an outstanding circular web on said hub having an inclined and stepped outer peripheral surface, a rim portion having an inclined and stepped inner peripheral surface adapted to be mounted on said web, a ring adapted to abut against a part of said web and rim respectively to hold said rim on said web, the inclined and stepped peripheral surface of the rim cooperating with the inclined and stepped peripheral surface of the web to wedgingly hold said rim portion on said web portion, and means for maintaining said ring in abutting relation with said rim and said web, the inclined and stepped peripheral surfaces of the rim and web and said ring cooperating to prevent lateral movement of said rim with relation to said web.

In testimony whereof I hereby affix my signature.

JOHN A. TIDBALL.